(12) United States Patent
Bryant (10) Patent No.: US 12,253,250 B2
(45) Date of Patent: Mar. 18, 2025

(54) MOLDED LIGHTING DEVICE FOR USE ON APPAREL AND APPAREL ARTICLE HAVING SAME (71) Applicant: Holicap, Inc., Fort Lauderdale, FL (US)

(72) Inventor: Travis Anton Bryant, Deerfield Beach, FL (US)

(73) Assignee: HOLICAP, INC., Fort Lauderdale, FL (US)

( * ) Notice: Subject to any disclaimer, the term of this patent is extended or adjusted under 35 U.S.C. 154(b) by 0 days.

(21) Appl. No.: 18/583,427

(22) Filed: Feb. 21, 2024

(65) Prior Publication Data

US 2024/0280252 A1 Aug. 22, 2024

Related U.S. Application Data

(60) Provisional application No. 63/447,203, filed on Feb. 21, 2023.

(51) Int. Cl.
*G09F 13/04* (2006.01)
*A42B 1/004* (2021.01)
*B29C 33/42* (2006.01)
*B29C 35/02* (2006.01)
*B29C 70/70* (2006.01)
(Continued)

(52) U.S. Cl.
CPC .......... *F21V 33/0008* (2013.01); *A42B 1/004* (2013.01); *B29C 33/42* (2013.01); *B29C 35/02* (2013.01); *B29C 70/70* (2013.01); *B29C 70/72* (2013.01); *F21V 3/02* (2013.01); *F21V 3/0625* (2018.02); *F21V 23/04* (2013.01); *G09F 3/18* (2013.01); *G09F 13/005* (2013.01);
(Continued)

(58) Field of Classification Search
CPC ...... F21V 33/0008; F21V 3/0625; F21V 3/02; F21V 23/04; G09F 21/023; G09F 3/18; G09F 13/005; G09F 13/0404; G09F 13/0409; A42B 1/004; B29C 33/42; B29C 70/70; B29C 70/72
See application file for complete search history.

(56) References Cited

U.S. PATENT DOCUMENTS 5,239,450 A   8/1993   Wall
5,278,734 A   1/1994   Ferber
(Continued)

OTHER PUBLICATIONS

International Search Report and Written Opinion for PCT/US24/16755, Authorized Officer Kari Rodriguez, Mailing Date of Jun. 26, 2024.

*Primary Examiner* — Gary C Hoge
(74) *Attorney, Agent, or Firm* — The Concept Law Group, PA; Scott D. Smiley; Scott M. Garrett (57) ABSTRACT

A lighting device for use on apparel includes a main body portion and a raised graphic portion at the front of the main body. Inside the device there is a graphic element in the raised portion that is translucent. Behind the graphic element and inside the main body of the device there is one or more lighting elements, a control circuit, and a battery. There is a power connector at a side of the main body, or in a remote connector, to charge the battery, and one or more switches either at the side of the main body or on the remote connector to allow a person to control the lighting operation of the device. The device is molded in the form of the graphic element and the graphic element, lighting element, battery, and circuitry are embedded in the molded body.

12 Claims, 11 Drawing Sheets

(51) Int. Cl.
  *B29C 70/72* (2006.01)
  *F21V 3/02* (2006.01)
  *F21V 3/06* (2018.01)
  *F21V 23/04* (2006.01)
  *F21V 33/00* (2006.01)
  *G09F 3/18* (2006.01)
  *G09F 13/00* (2006.01)
  *G09F 21/02* (2006.01)

(52) U.S. Cl.
  CPC ...... *G09F 13/0404* (2013.01); *G09F 13/0409* (2013.01); *G09F 21/023* (2020.05)

(56) References Cited

U.S. PATENT DOCUMENTS

| | | | |
|---|---|---|---|
| 5,509,144 A | 4/1996 | Soergel et al. | |
| 5,680,718 A | 10/1997 | Ratcliffe et al. | |
| 6,007,211 A * | 12/1999 | Cheung | G09F 13/00 362/311.03 |
| 6,116,745 A | 9/2000 | Yei | |
| 6,174,075 B1 * | 1/2001 | Fuwausa | F21L 2/00 362/310 |
| 6,932,487 B2 | 8/2005 | Aknine | |
| 7,611,255 B1 | 11/2009 | Lagassey | |
| 7,699,485 B1 | 4/2010 | Lagassey | |
| 7,824,053 B2 | 11/2010 | Maier, Sr. | |
| 7,866,858 B2 * | 1/2011 | Hirzmann | G09F 13/22 362/487 |
| 8,333,485 B2 | 12/2012 | Waters | |
| 8,425,072 B2 | 4/2013 | Hurwitz | |
| 8,503,711 B2 | 8/2013 | Flynn | |
| 8,869,312 B2 | 10/2014 | Tuohy et al. | |
| 9,526,287 B2 | 12/2016 | Waters | |
| 9,669,292 B1 | 6/2017 | Warner et al. | |
| 10,791,783 B1 | 10/2020 | Waters | |
| 10,984,685 B1 * | 4/2021 | Kempisty | A41D 29/00 |
| 11,206,887 B1 * | 12/2021 | Templer | B29D 99/0064 |
| 2004/0093658 A1 | 5/2004 | Jackson | |
| 2004/0221920 A1 * | 11/2004 | Ferguson | B67D 7/426 141/392 |
| 2008/0225552 A1 * | 9/2008 | Capriola | G09F 13/0409 362/555 |
| 2010/0313334 A1 | 12/2010 | Moy | |
| 2014/0333211 A1 * | 11/2014 | Oka | G06F 3/038 315/159 |
| 2015/0146903 A1 * | 5/2015 | Mariasov | H04R 1/028 381/333 |
| 2016/0242482 A1 * | 8/2016 | Cabral | G02B 6/0008 |
| 2016/0377271 A1 * | 12/2016 | Kelly | H05B 47/105 315/178 |
| 2017/0027249 A1 * | 2/2017 | Kull | A41D 27/085 |
| 2017/0101047 A1 * | 4/2017 | Dellock | F21K 9/64 |
| 2017/0135198 A1 | 5/2017 | Keranen et al. | |
| 2017/0347733 A1 | 12/2017 | Durand, Jr. | |
| 2018/0022274 A1 * | 1/2018 | Kincade | G02B 6/0085 362/23.09 |
| 2018/0049500 A1 | 2/2018 | Richardson | |
| 2018/0149346 A1 * | 5/2018 | Rapisarda | F21V 33/0008 |
| 2018/0317584 A1 | 11/2018 | Wiza | |
| 2018/0338555 A1 * | 11/2018 | Crystal | G09F 9/3023 |
| 2020/0355361 A1 | 11/2020 | Bryant | |
| 2022/0264983 A1 * | 8/2022 | Oh | F21V 33/0008 |
| 2023/0292863 A1 * | 9/2023 | Obregon | F21V 33/0008 362/103 |

\* cited by examiner

MOLDED LIGHTING DEVICE FOR USE ON APPAREL AND APPAREL ARTICLE HAVING SAME

CROSS REFERENCE

This application claims the benefit of U.S. Provisional App. No. 63/447,203, which was filed on Feb. 21, 2023, the entirety of which is hereby incorporated by reference.

FIELD OF THE INVENTION

The present invention relates generally to decorative lighting devices for affixing to apparel, and, more particularly, relates to a silicone molded self-contained decorative lighting device that includes a rechargeable battery and user controls that are accessible to control operation of the lighting device.

BACKGROUND OF THE INVENTION

People enjoy wearing apparel and apparel accessories that indicate something they support. This is especially true with sports apparel. People wear jerseys and hats with team logos and designs, and there is a large market for this kind of apparel. In addition, there are accessories that also can depict various designs that people can wear, and some of these accessories can have lighting elements. However, these accessories are often not robust and often tend to fall apart with repeated use.

Therefore, a need exists to overcome the problems with the prior art as discussed above.

SUMMARY

In accordance with some embodiment of the inventive disclosure, there is provided a lighting device that includes a body comprised of a cured moldable material. There is at least one graphical element disposed in the cured moldable material of the body at a front of the body. There is also a circuit board disposed behind the graphical element in the cured moldable material of the body. There can be at least one switch disposed on the circuit board, and a power connector disposed on the circuit board. A control portion of the at least one switch extends from inside of the cured moldable material of the body to an outside of the body, and wherein a connector portion of the power connector extends from inside of the cured moldable material of the body to outside of the body. There is aa battery disposed in the cured moldable material of the body. There is also at least one lighting element disposed in the cured moldable material of the body that is controlled by circuitry on the circuit board, responsive to operation of the at least one switch. The cured moldable material of the body fills a complete volume of the body around the at least one graphical element, circuit board, battery, at least one switch, power connector, and at least one lighting element.

In accordance with a further feature, the cured moldable material is silicone.

In accordance with a further feature, there is also included a patch of fastener material adhered to a back of the lighting device, opposite the front of the body.

In accordance with a further feature, the cured moldable material is transparent or translucent.

In accordance with a further feature, the graphical element has at least an opaque portion, and wherein the circuit board, battery, and at least one lighting element are not directly viewable from a front of the body due to being blocked from view by the opaque portion of the graphical element.

In accordance with a further feature, the body further includes a periphery that extends outward from the body around a perimeter of the body at a back side of the body.

In accordance with a further feature, there is further included a light diffusing element positioned between the at least one lighting element and the at least one graphic element.

In accordance with some embodiment of the inventive disclosure, there is provided a hat that includes an exterior surface and there is a lighting device attached to the exterior surface. The lighting device includes a body comprised of a cured moldable material having a main body portion and a raised portion at a front of the main body portion. There is also at least one graphical element disposed in the cured moldable material of the body in the raised portion. There is also at least one lighting element disposed in the cured moldable material of the body behind the graphical element in the cured moldable material of the body. There is a lighting control circuit disposed in the cured moldable material of the body behind the graphical element which is configured to control an operation of the at least one lighting element. There is also a battery disposed in the cured moldable material of the body, and that is operably coupled to the at least one lighting element and the lighting control circuit. The cured moldable material of the body fills a complete volume of the body around the at least one graphical element, lighting control circuit, battery, and the at least one lighting element.

In accordance with a further feature, the lighting device is attached to the hat by stitching that passes through the main body portion.

In accordance with a further feature, the body further includes a periphery around a perimeter of a back side of the main body portion, and wherein the stitching passes through the periphery.

In accordance with a further feature, there is also a layer of material disposed in the cured moldable material of the body at a back of the main body portion and which extends into the periphery.

In accordance with a further feature, an inner side of the layer of material is reflective.

In accordance with a further feature, a remote connector is coupled to the lighting control circuit in the main body portion by wires, the remote connector being disposed in the hat remotely from the main body portion and including a power connector.

In accordance with a further feature, the remote connector includes a switch for control an operation of the at least one lighting element of the lighting device.

In accordance with a further feature, there is also a light diffuser positioned between the at least one graphic element and the at least one lighting element.

In accordance with some embodiment of the inventive disclosure, there is provided a method of making a lighting device for use on an apparel article that includes providing a mold having a shape of an outline of a graphic element, the mold having a main body portion, and a raised portion extending downward at a bottom of the mold, the raised portion having a configuration that corresponds to the graphic element. The method further includes placing the graphic element into the raised portion of the mold, the graphic element being translucent. The method further includes placing at least one lighting element over the graphic element, and placing a lighting control circuit into the mold that is operable coupled to the at least one lighting element. The method also includes placing a battery in the mold that is operably coupled to the lighting control circuit and the at least one lighting element. The method also includes pouring a curable transparent material into the mold, covering the graphic element, at least one lighting element, lighting control circuit, and battery, and curing the curable transparent material.

In accordance with a further feature, the method also includes providing a power connector that is operably coupled to the lighting control circuit and at least one switch that is operably coupled to the lighting control circuit and the battery.

In accordance with a further feature, providing the mold further comprises providing the mold having a periphery around a perimeter of a top of the mold.

Although the invention is illustrated and described herein as embodied in a lighting device for apparel, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1A:
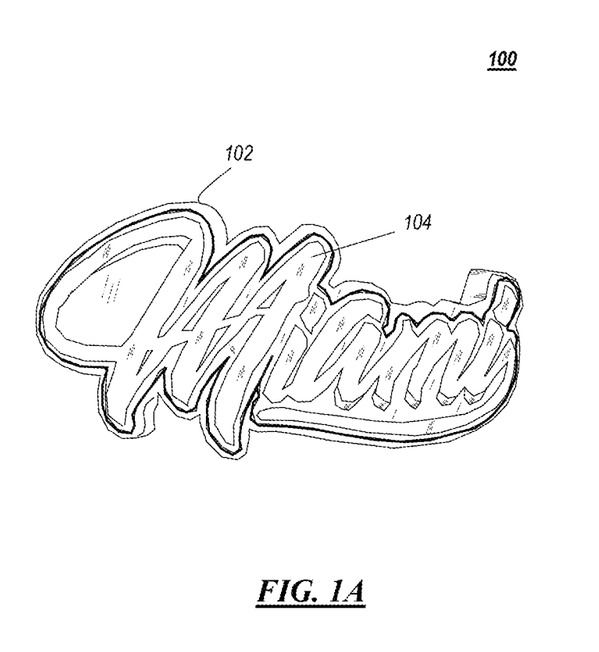
FIG. 1A is a front view of a lighted accessory for use on apparel, in accordance with some embodiments.

FIG. 1A is a front view of a lighted accessory 100 for use on apparel, in accordance with some embodiments. The lighted accessory is a device that has, on its front, a raised graphic 104, such as, for example, lettering. The raised graphic 104 is raised relative to the main body 102 of the accessory 100, which also houses the circuitry, battery, light emitting elements, and light spreading/diffusing members. As shown here, the accessory 100 has a main body 102 on which is a graphic 104 in the form of raised stylized lettering that spells "Miami." The accessory can include controls that allow a user to control the light effect, such as, for example, choosing between brightness levels, colors, flashing patterns, and so on. The main body 102 of the accessory 100 is made of a cured silicone material in which the internal components (circuit components, light emitting elements, etc.) are embedded. The controls are provided external to the main body 102 so as to be accessible, either on a side of the main body 102 or in a remote portion via wires. The accessory is intended to be affixed or attached to an apparel item, such as a cap.

Figure 1B:
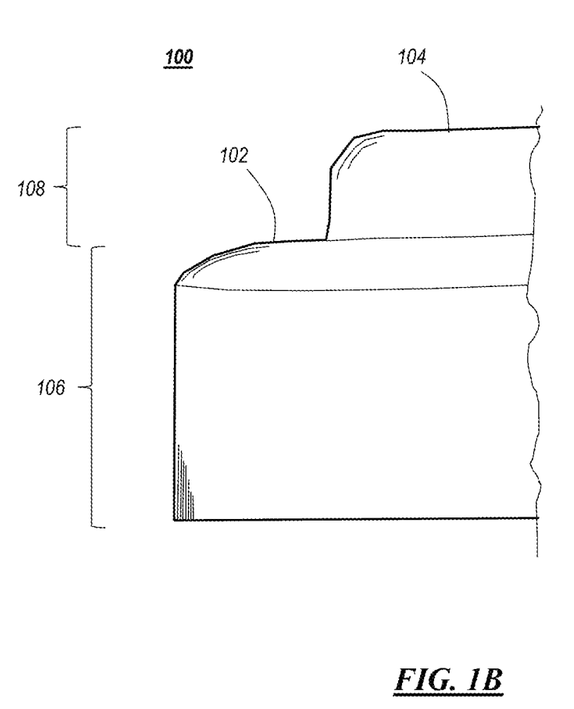
FIG. 1B is a side elevational view of a lighted accessory, in accordance with some embodiments.

FIG. 1B is a side elevational view of a lighted accessory, in accordance with some embodiments. A portion of the accessory 100 at a side/edge of the accessory 100 is shown here. There is a portion of the main body 102, which includes a side having a height 108, and on which there is a raised graphic portion 104, which has a height 108 above the main body 102. Both the main body 102 and raised graphic 104 are made of a transparent or translucent material, such as, for example, silicone, in which there are embedded circuitry components and light emitting elements, as well as light-affecting structure such as light diffusers and colored translucent members for creating color. The shoulders of the main body portion, at the front, and the raised portion, wherein the front surface transitions to a side surface, can be rounded (as opposed to right angles) to enhance the lighting effect.

Figure 1C:
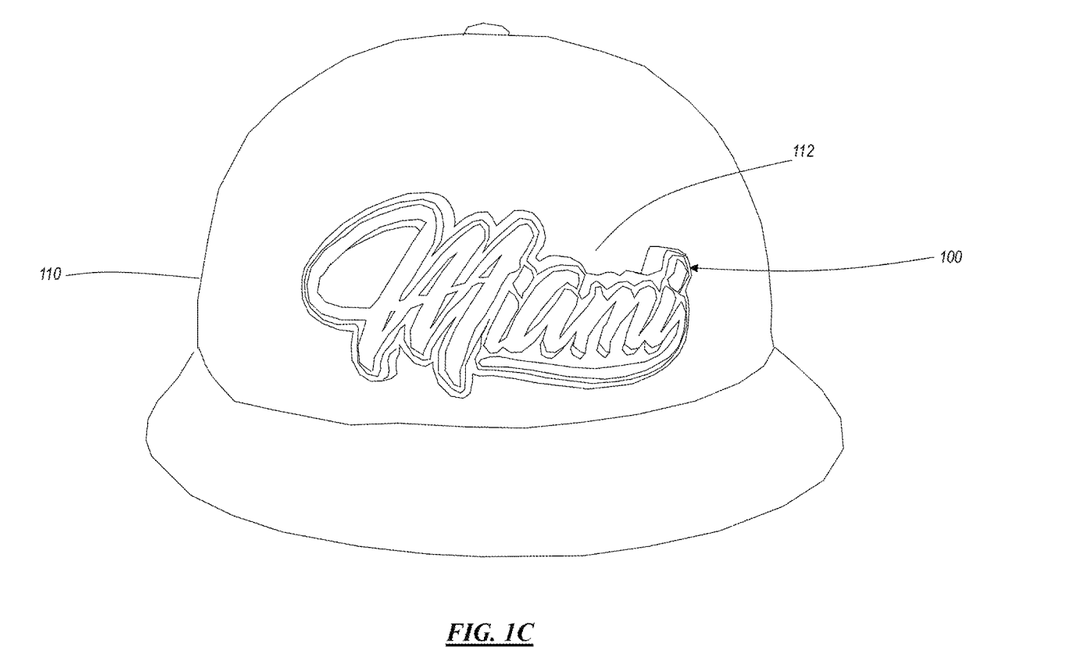
FIG. 1C is a front view of a baseball style cap having a lighted accessory on the front, in accordance with some embodiments.

FIG. 1C is a front view of a baseball style cap 110 having a lighted accessory device 100 attached on the front 112 of the cap, in accordance with some embodiments. The lighted accessory device 100 is configured in the shape of writing, and contains circuitry, a rechargeable battery, and lighting elements powered by the battery and controlled by the circuitry. The lighted accessory device 100 can be attached to the front 112 of the cap 110 such as by a layer of hook and loop type fastener material, having a layer on the back of the lighted accessory device 100 and a layer on the front 112 of the cap 100, in some embodiments. Alternatively, the lighting accessory device 100 can be more permanently attached to the cap 110, such as by sewing a periphery of the lighted accessory device 100 to the front 112 of the cap 110. The lighted accessory device 100 comprises a body 102 that is made of molded material that can be transparent or translucent, and in which there can be opaque graphical elements placed. For example, as shown here, an opaque element in the shape of a stylized word ("Miami") is shown here. Generally, the opaque element or elements are placed in a mold, and then the battery, circuity, and lighting elements are placed in the mold on top of the opaque element(s), and then a moldable material is poured over these components. The mold and the circuit elements are configured so that user controls extend outside of the moldable material and will be accessible by a user once the moldable material cures. In some embodiments the control and charging connector can be outside of the main body and connected by suitable wiring. The moldable material can be, for example, silicone, rubber, plastic, resin, and the like, and is an electrical insulator. Once the material is cured, a layer of fastener material can be adhered on the back side of the device in some embodiments.

Thus, the lighting accessory device includes a body comprised of a cured moldable material. There is at least one graphical element disposed in the cured moldable material of the body at a front of the body. There is also a circuit board disposed behind the graphical element in the cured moldable material of the body. There can be at least one switch disposed on the circuit board, and a power connector disposed on the circuit board. A control portion of the at least one switch extends from inside of the cured moldable material of the body to an outside of the body, and wherein a connector portion of the power connector extends from inside of the cured moldable material of the body to outside of the body. There is aa battery disposed in the cured moldable material of the body. There is also at least one lighting element disposed in the cured moldable material of the body that is controlled by circuitry on the circuit board, responsive to operation of the at least one switch. The cured moldable material of the body fills a complete volume of the body around the at least one graphical element, circuit board, battery, at least one switch, power connector, and at least one lighting element.

Figure 2:
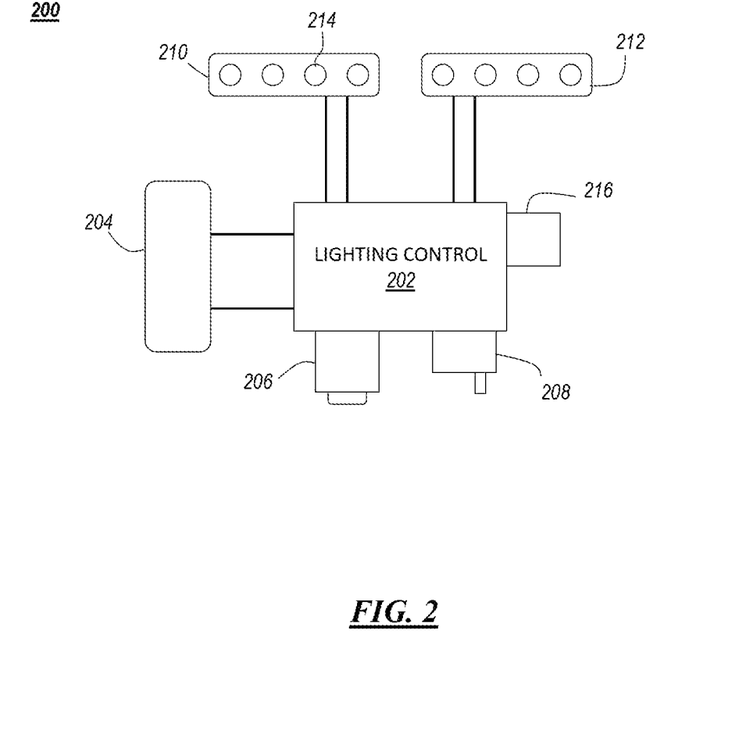
FIG. 2 is a block schematic diagram of the electrical and electronic elements of a lighted accessory device, in accordance with some embodiments.

FIG. 2 is a block schematic diagram 200 of the electrical and electronic elements of a lighted accessory device 100, in accordance with some embodiments. A circuit board includes lighting control circuitry 202 for controlling lighting elements 210, 212, that can each have multiple light emitting diodes 214 or similar light producing elements. The circuitry 202 can also control charging and current/voltage regulation of a battery 204. The lighting control circuitry 202 can be disposed on a circuit board, as are user controls that can include a button switch 206, and slide switch 208, and a power connector 216. In some embodiments the button switch 206 or the slide switch 208 may not be used. In some embodiments the slide switch 208 turns the lighting control circuitry 202 on/off, and the button switch 206 causes the lighting control circuit 202 to control the output of the lighting elements 210, 212 to cycle through different lighting patterns (e.g. constantly on, flashing, phasing between dim and bright). The connector 216 can be, for example, a micro-USB connector. The switches 206, 208, and connector 216 can be supported on the same circuit board as the lighting control circuitry 202, and can be positioned near an edge of the mold so that the switch 206, 208 and connector 216 extend slightly outside of the mold, and are thus not covered by the moldable material when the moldable material is poured into the mold. In some embodiments, the slide switch 208, button switch 206, and power connector 216 can be housed together in a remote housing structure, outside the main body 102 of the lighted accessory device 100, and coupled to the lighting control circuitry 202 via suitable wiring.

Figure 3:
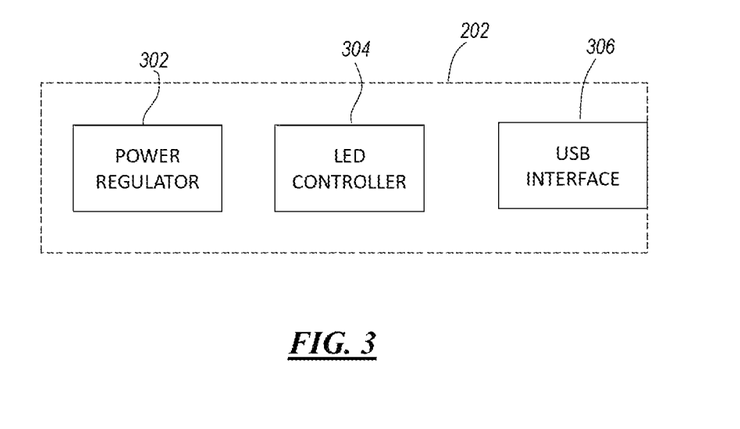
FIG. 3 is a more detail block diagram of circuit functions of a lighted accessory device, in accordance with some embodiments.

FIG. 3 is a more detail block diagram of circuit functions of a lighted accessory device 100, in accordance with some embodiments. There can be a power regulator circuit 302 that regulates power to the lighting elements (e.g. 210, 212). The lighting elements 210, 212 can comprises a plurality of light emitting diodes (LEDs). The power regulator 302 can be controlled by an LED controller 304, which can be responsive to the button switch 206 to cycle between lighting modes or patterns. The USB interface 306 allows power to be provided to recharge the battery, and can be connected to a USB connector at the side of the lighted accessory device 100, or on a remotely located structure coupled to the lighted accessory device via wiring.

Figure 4:
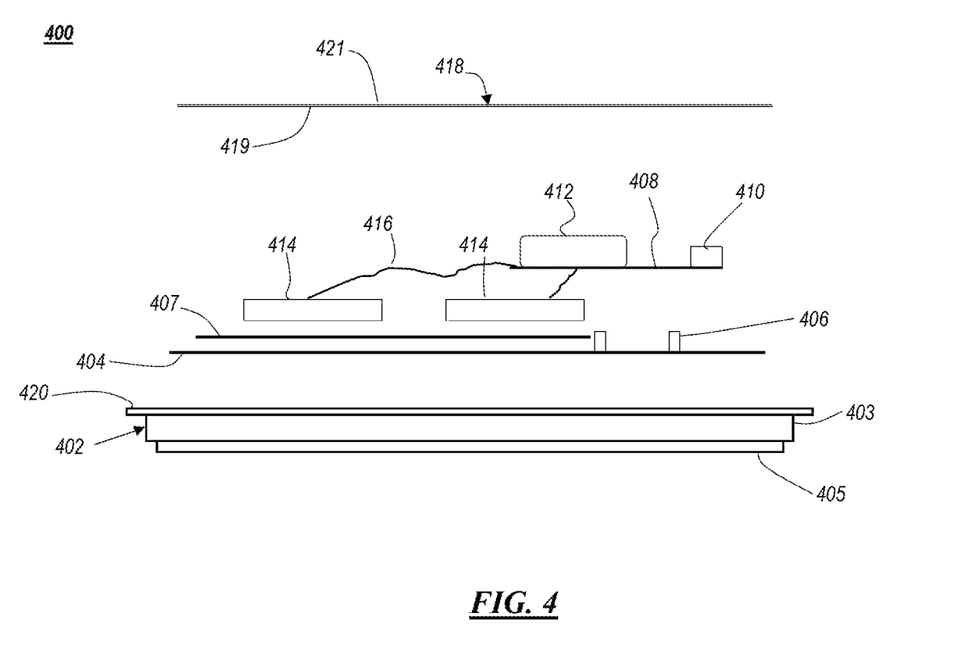
FIG. 4 is an exploded assembly view of a lighted accessory device, in accordance with some embodiments.

FIG. 4 is an exploded assembly view of a lighted accessory device 400, in accordance with some embodiments. The lighted accessory device 400 can be substantially similar or the same as lighted accessory device 100 discussed previously. The view shows the elements, other than the body material, that are included in the device, and the mold 402 in which the elements are placed. The mold 402 has the desired external shape of the device, and is configured to hold the moldable material and other elements until the moldable material cures and includes a main body portion 403 and a raised graphic portion 405. The electrical and other elements shown here are not shown to scale relative to the mold 402 as in the actual device being made all of the components represented here fit into the mold 402.

In general, the elements are loaded into and arranged in the mold 402, and then the moldable material is poured into the mold to fill the volume of the mold 402. Generally, one or more graphical elements 404 are first placed into the mold 402, and in particular into the raised section 405. The graphical elements 404 can configured in the shape of some recognizable figure, such as writing or other recognizable images or objects, and they are generally flat, translucent members through which light is emitted. The bottom here is the portion 405 in which the raised graphic portion (e.g., 104) is formed, and it forms the face of the device 400, so the graphical elements 404 will be at the front of the device 400 upon completion of the molding process. The graphical elements 404 can have retaining features 406 that couple to, and hold a circuit board 408 in place on the back of the graphical element 404.

The circuit board 408 has the majority of the circuitry disposed on the circuit board, including, for example one or more switches 410, and a power connector (not shown here) that are arranged on the circuit board to extend outside of the mold 402. A battery 412 can be disposed on the circuit board 408 or elsewhere behind the graphical element 404 but is otherwise wired to the circuit board 408. One or more lighting elements 414 are connected to the circuit board 408 via wiring 416 and controlled by circuitry on the circuit board 408. The lighting elements 414 can also be retained on the back of the graphical element 404 such as by additional retaining features such as 406 used to hold the circuit board 408 in place. In some embodiments a light diffusing element 407 can be placed between the lighting elements 414 and the graphical elements 404 to prevent the appearance of "hot spots" and diffuse the light emitted by the light emitting elements 414 across the graphical elements 404. The retaining features 406 can be clips or simply posts to align the battery, lighting elements, and circuit board.

The elements shown here and loaded in a vertical stack into the mold 402, and then a curable transparent or translucent material is poured over the elements into the mold and allowed to cure. The material can be, for example, silicone, plastic, rubber, or other pourable materials that will harden. The circuit board 408 can be a flexible two-sided circuit board on which the lighting control circuitry and lighting elements 414, as well as the battery 412, and connectors/switches 410 can be mounted. As mentioned, it is intended that all of the elements shown here can be placed entirely in the mold 402 such that the back side of the resulting lighted accessory device, which will be the top/uppermost surface of the cured mold material, is substantially flat. In some embodiments a section of material 418 can then be affixed to the lighted accessory device, which can include a layer of reflective material 419 to reflect light towards the front of the lighted accessory device. The backside 421 of the material 418 can be opaque and non-reflective, and can have a hook or loop material disposed thereon to join to a corresponding hook/loop material on an apparel article. Alternatively, the mold can include a section 420 around the top of the mold 402 that creates a periphery that extends outward from the base of the main body of the lighted accessory device, and which allows the lighted accessory device to be sewn to an apparel article. The material 418 can extend into the periphery 420 to strengthen to periphery region.

Figure 5:
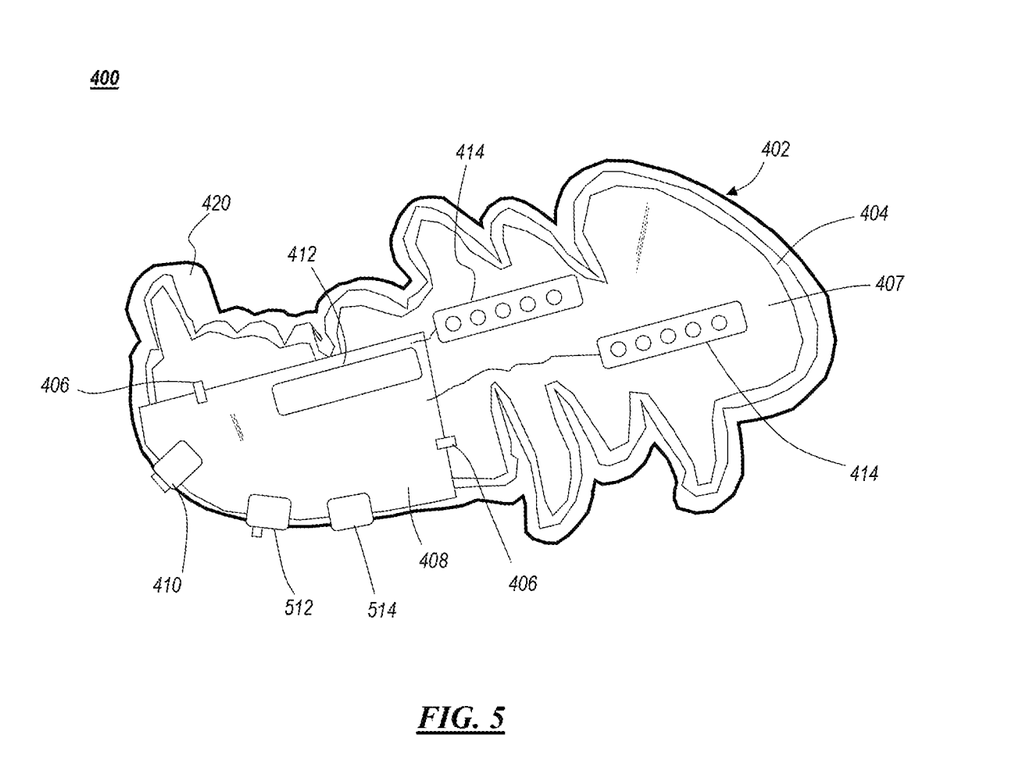
FIG. 5 is a downward view of the rear of a lighted accessory device in a mold, in accordance with some embodiments.

FIG. 5 is a downward view of the rear of a lighted accessory device 400 in a mold 402, in accordance with some embodiments. his view shows the elements in the mold 402 prior to pouring the moldable material. There is seen a graphical element 404 that is a stylized graphic depicting the word "Miami" as is seen in FIG. 1. On top of the graphical element 404 is the light diffuser elements 407, and on top of the light diffuser 407 is a circuit board 408 that includes a battery 412. A push button switch 410 is disposed on the circuit board 408, and extends, horizontally, outside of the mold 402 to ensure that a user can access and operate the push button switch 410. Likewise, a slide switch 512 is mounted on the circuit board 408 in a position that it also extends outside of the mold 402. And a power or micro-USB connector 514 is also disposed on the circuit board 408 and extends outside of the mold 402. The circuit board 408 includes circuitry for operating the lighting elements 414, that are wired to the circuit board 408, and which can include one or more light producing devices (e.g. LEDs). Retaining features 406 can extend from the back of the graphical element 404 and are positioned and configured to hold the circuit board 506 in place during the molding process. Similar features can be used for the lighting elements 414. Once the various components are arranged in the mold 402 as shown, a curable material is then poured into the mold 402, filling in spaces, and covering most, if not all of the components, leaving only the portions of the switches 410, 512, and power connector 514 that are outside of the mold exposed.

It will be appreciated that the graphic element 404 will fit only into the raised portion 405 of the mold, and the raised portion 405 will be shaped in correspondence with the graphic. Thus, if the graphic is writing, such as a stylized depiction of "Miami," then the raised portion will only be raised where the portions of the stylized writing are located. The graphic elements 404 are simply translucent flat sections of material than, when looked at from the front, form the desired graphic. Thus, the material of the graphic element 404 can be, for example, frosted mylar sheeting, colored tissue paper, or any other suitably translucent, flat material that be cut/configured to the desired graphic. The light diffuser 407 can cover substantially the entire mold, and can be a sheet of transparent material that is frosted on the outward-facing side (e.g. the side adjacent the graphic member 404). The retaining member 406 can pass through slots cut into the light diffuser 407, if necessary. Also, it will be appreciated that the cover element 418 is not shown here as it would cover and obscure the view of the other elements in the mold 402.

Thus, the method of making the lighted accessory device includes providing a mold having a shape of an outline of a graphic element, the mold having a main body portion, and a raised portion extending downward at a bottom of the mold, the raised portion having a configuration that corresponds to the graphic element. The method further includes placing the graphic element into the raised portion of the mold, the graphic element being translucent. The method further includes placing at least one lighting element over the graphic element, and placing a lighting control circuit into the mold that is operable coupled to the at least one lighting element. The method also includes placing a battery in the mold that is operably coupled to the lighting control circuit and the at least one lighting element. The method also includes pouring a curable transparent material into the mold, covering the graphic element, at least one lighting element, lighting control circuit, and battery, and curing the curable transparent material.

Figure 6:
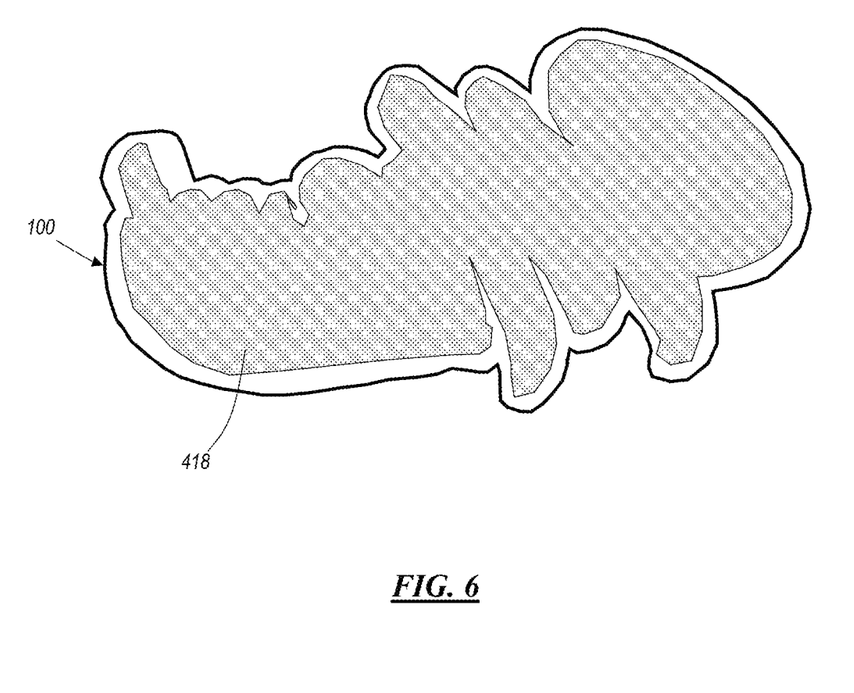
FIG. 6 is a rear view of a lighted accessory device including a layer of fastening material for attachment to an apparel article, in accordance with some embodiments.

FIG. 6 is a rear view of a lighted accessory device 100 including a layer of fastening material 418 for attachment to an apparel article, in accordance with some embodiments. In this view the moldable material has been poured over the components shown in FIG. 5, and the poured material has been cured. Further, a patch of material 418 has been adhered on the cured material that allows the device 100 to be fastened onto apparel having a corresponding fastening material. The patch 418 can be, for example, a layer of hooks for a hook and loop interface, where the apparel has a patch of loop material to which the device can then be fastened. Alternatively, the patch 418 can simply be an opaque member prevents light from escaping at the back side of the device 100, and can include reflective material on the interior side (e.g., 419). The device 100 shown here can be the same as that shown in FIG. 1 attached to the hat, but it is shown from the rear here, before being placed onto the hat.

Figure 7:
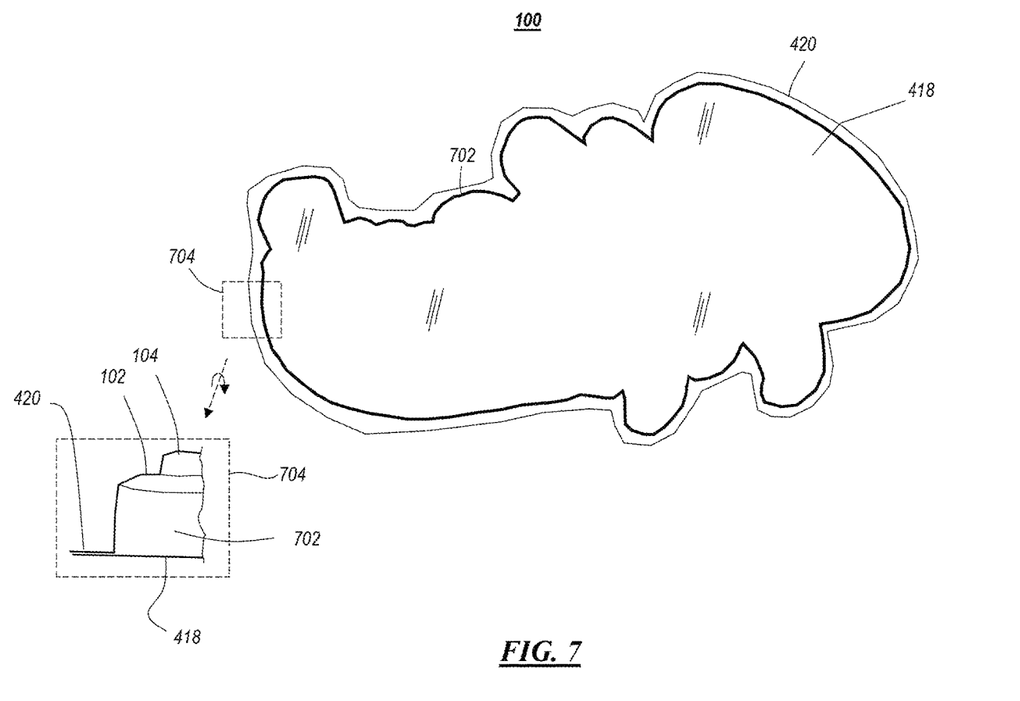
FIG. 7 shows a back view of the lighted accessory device for use with an apparel article, in accordance with some embodiments.
Figure 8:
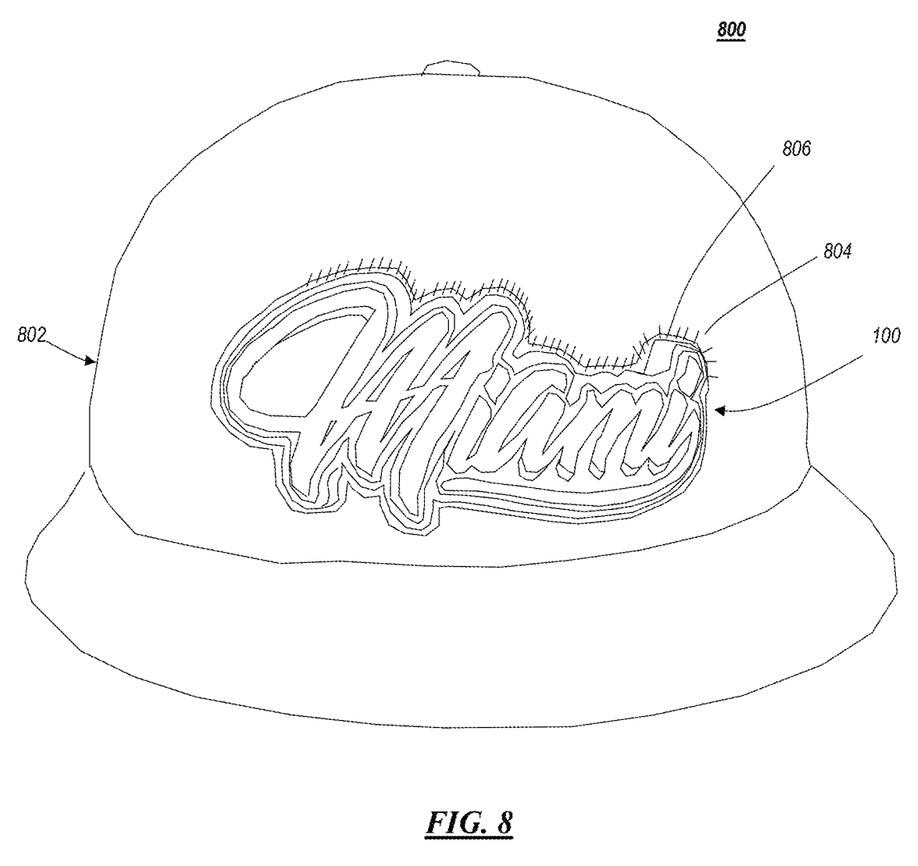
FIG. 8 shows a front view of a hat on which a lighted accessory device has been sewn, in accordance with some embodiments.

FIG. 7 shows a back view of the lighted accessory device 100 for use with an apparel article, in accordance with some embodiments. In this view, the periphery 420 is used to sew the device 100 to an apparel article, and there is no attachment material present on layer 418, such as hook/loop material. The inset shows a side view (rotated ninety degrees) to show the raised portion 104 and the main body 102 having a sidewall 702. The periphery 420 extends from the sidewall 702 at the back side of the device 100 around the perimeter of the device. Although not indicated here for the sake of clarity, the material 418 can extend to the outward perimeter of the periphery, as shown in the inset 704, in order to strengthen the periphery 420. FIG. 8 shows a front view 800 of a hat 802 on which a lighted accessory device 100 has been sewn, in accordance with some embodiments. Stitching 806 passes through the periphery 420 and the material of the hat, and holds the device 100 to the hat.

Figure 9:
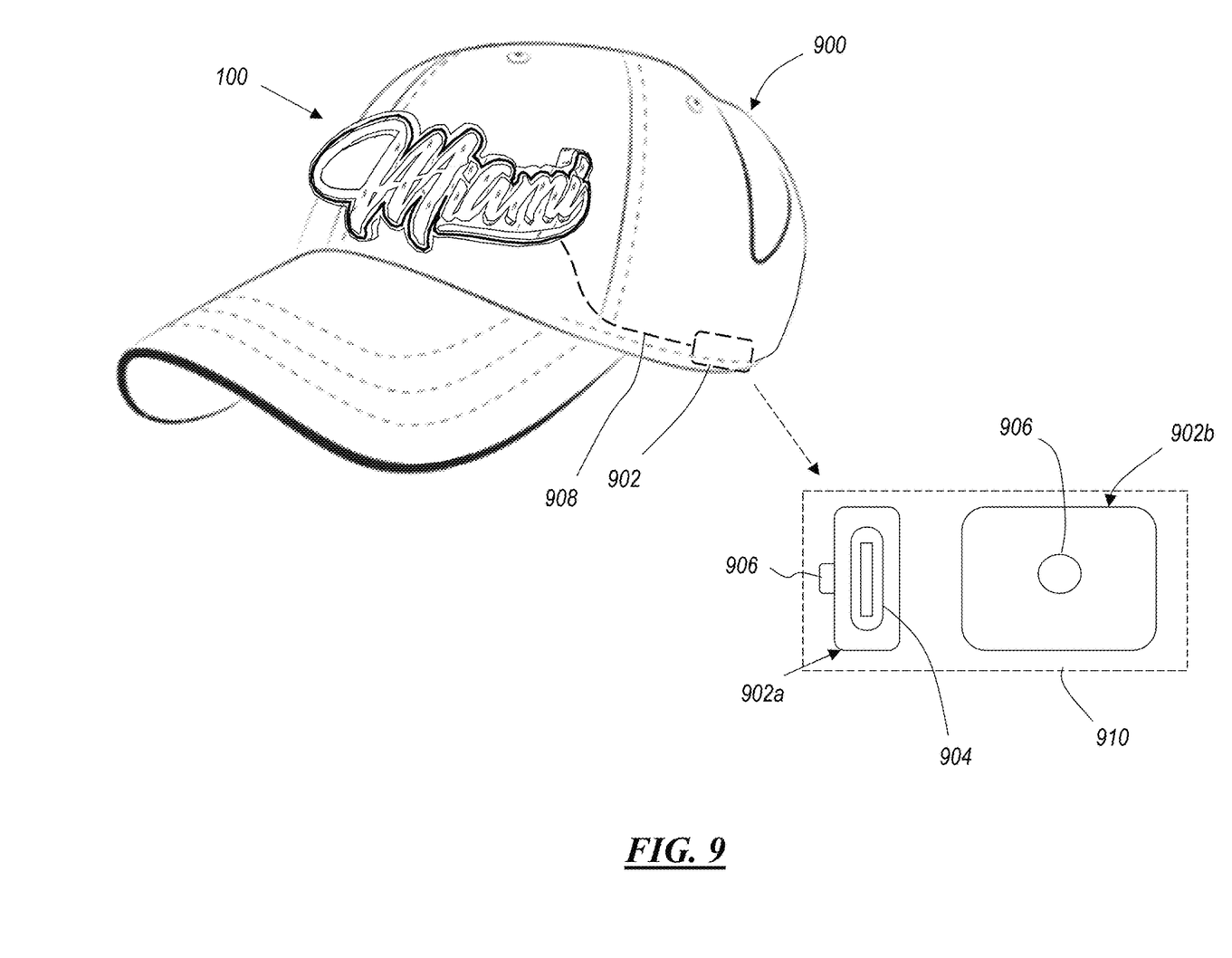
FIG. 9 shows a side perspective view of a hat having a lighted accessory device, in which the control and power connector are located remotely in the hat from the lighted accessory device, in accordance with some embodiments.

FIG. 9 shows a side perspective view of a hat 900 having a lighted accessory device 100, in which the control and power connector are located remotely in the hat from the lighted accessory device, in accordance with some embodiments. A remote connector 902 is coupled to the device 100 by wires 908, which can be, for example, a USB cable or equivalent. The wires 908 can pass through the material of the hat 900 in a location between the hat 900 and the back side of the device 100, and run along in the inside of the hat 900. Alternatively, in some embodiments, the remote connector 902 and wires 908 can be on the outside of the hat 900. In the inset 910 there is shown an end view 902a and a top view 902b of the remote connector 902. In the end view 902a the power connector 904 can be seen, along with the profile of the mode button 906, which can be substantially the same as the button switch 206. In the top view 902b the mode switch 906 is shown at the top surface. A power switch can also be included on the remote connector 902, or it can be located on the side of the device 100. The power connector 904 can be a common USB connector that allows charging of the battery. As shown, the remote connector 902 can be positioned at a side of the hat, but can also be positioned at other locations around the hat.

Thus, according to some embodiments, there is provided a hat that includes an exterior surface and there is a lighting device attached to the exterior surface. The lighting device includes a body comprised of a cured moldable material having a main body portion and a raised portion at a front of the main body portion. There is also at least one graphical element disposed in the cured moldable material of the body in the raised portion. There is also at least one lighting element disposed in the cured moldable material of the body behind the graphical element in the cured moldable material of the body. There is a lighting control circuit disposed in the cured moldable material of the body behind the graphical element which is configured to control an operation of the at least one lighting element. There is also a battery disposed in the cured moldable material of the body, and that is operably coupled to the at least one lighting element and the lighting control circuit. The cured moldable material of the body fills a complete volume of the body around the at least one graphical element, lighting control circuit, battery, and the at least one lighting element.

The inventive embodiments provide for a lighting device and an apparel article using a lighting device that is made of a molded, cured body, where the material of the body is transparent or translucent. The material of the body can be clear or colored. In the body there is a graphic element or elements disposed at a front of the body, preferably in a raised portion that extends forward from a front of the body. There is also a lighting element, control circuit, and battery disposed in the body. As a result, the components in the body are protected from water, and provide an attractive lighting effect.

What is claimed is:
1. A lighting device, comprising:
a body comprised of a cured moldable material;
at least one graphical element disposed in the cured moldable material of the body at a front of the body;
a circuit board disposed behind the graphical element in the cured moldable material of the body, at least one switch disposed on the circuit board, and a power connector disposed on the circuit board;
wherein a control portion of the at least one switch extends from inside of the cured moldable material of the body to an outside of the body, and wherein a connector portion of the power connector extends from inside of the cured moldable material of the body to outside of the body;

a battery disposed in the cured moldable material of the body;

at least one lighting element disposed in the cured moldable material of the body that is controlled by circuitry on the circuit board, responsive to operation of the at least one switch; and wherein the cured moldable material of the body fills a complete volume of the body around the at least one graphical element, circuit board, battery, at least one switch, power connector, and at least one lighting element.

2. The lighting device of claim 1, wherein the cured moldable material is silicone.

3. The lighting device of claim 1, further comprising a patch of fastener material adhered to a back of the lighting device, opposite the front of the body.

4. The lighting device of claim 1, wherein the cured moldable material is transparent or translucent.

5. The lighting device of claim 1, wherein the graphical element has at least an opaque portion, and wherein the circuit board, battery, and at least one lighting element are not directly viewable from a front of the body due to being blocked from view by the opaque portion of the graphical element.

6. The lighting device of claim 1, wherein the body further includes a periphery that extends outward from the body around a perimeter of the body at a back side of the body.

7. The lighting device of claim 1, further comprising a light diffusing element positioned between the at least one lighting element and the at least one graphic element.

8. A lighting device, comprising:
a body comprised of a cured moldable material and having a main body portion and a raised graphic portion that is raised relative to the main body portion, the main body having a sidewall with a shoulder defined around the raised portion between the sidewall of the main body portion and the raised portion;
at least one graphical element disposed in the cured moldable material of the body at a front of the body;
a circuit board disposed behind the graphical element in the cured moldable material of the body;
at least one lighting element disposed in the cured moldable material of the body that is controlled by circuitry on the circuit board, responsive to operation of at least one switch;
wherein the cured moldable material of the body completely fills a volume of the body around the at least one graphical element, circuit board, and at least one lighting element such that the cured moldable material forms back side of the lighting device that is flat and covers the at least one graphical element, circuit board, and the at least one lighting element such that the at least one graphical element, circuit board, and the at least one lighting element are not exposed.

9. The lighting device of claim 8, further comprising a cover element disposed over the back side.

10. The lighting device of claim 9, wherein the cover element includes hook/loop material.

11. The lighting device of claim 8, wherein the at least one lighting element is coupled to a retaining feature on the at least one graphical element.

12. The lighting device of claim 8, further comprising a light diffuser positioned between the at least one lighting element and the at least one graphical element.

* * * * *